United States Patent
Sui et al.

(10) Patent No.: US 12,333,428 B2
(45) Date of Patent: Jun. 17, 2025

(54) NEURAL NETWORK MODEL PROCESSING METHOD AND APPARATUS

(71) Applicant: Huawei Technologies Co., Ltd., Shenzhen (CN)

(72) Inventors: Zhicheng Sui, Shenzhen (CN); Li Zhou, Shenzhen (CN); Lei Zhao, Shenzhen (CN); Mohan Liu, Shenzhen (CN); Qinghua Yu, Shanghai (CN); Hongrui Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 965 days.

(21) Appl. No.: 17/434,563

(22) PCT Filed: Feb. 27, 2019

(86) PCT No.: PCT/CN2019/076374
§ 371 (c)(1),
(2) Date: Aug. 27, 2021

(87) PCT Pub. No.: WO2020/172829
PCT Pub. Date: Sep. 3, 2020

(65) Prior Publication Data
US 2022/0121936 A1    Apr. 21, 2022

(51) Int. Cl.
*G06N 3/08* (2023.01)
*G06N 3/04* (2023.01)

(52) U.S. Cl.
CPC .......... *G06N 3/08* (2013.01); *G06N 3/04* (2013.01)

(58) Field of Classification Search
CPC ........... G06N 3/04; G06N 3/08; G06N 3/045; G06N 3/063; G06N 3/0495
See application file for complete search history.

(56) References Cited

U.S. PATENT DOCUMENTS 9,941,900 B1    4/2018  Horn et al.
2016/0217369 A1*  7/2016  Annapureddy ........ G06N 3/082
(Continued)

FOREIGN PATENT DOCUMENTS

CN    106796668 A    5/2017
CN    107395211 A    11/2017
(Continued)

OTHER PUBLICATIONS

Matteo Grimaldi et al, "Layer-Wise Compressive Training for Convolutional Neural Networks," Future Internet, 2019, 15 pages, XP055870564.
(Continued)

Primary Examiner — Dave Misir
(74) Attorney, Agent, or Firm — Conley Rose, P.C.

(57) ABSTRACT

A neural network model processing method includes obtaining a first low-bit neural network model through training, where the model includes a first operation layer and a second operation layer. Each operation layer includes at least one operation. Values/a value of a parameter and/or data used for the operation are/is represented by using N bits, and N is a positive integer less than 8. The neural network model processing method further includes compressing the model to obtain a second low-bit neural network model, where the compressed model includes a third operation layer. The third operation layer is equivalent to the first operation layer and the second operation layer, and an operation layer other than the third operation layer in the at least one operation layer is the same as an operation layer other than the first operation layer and the second operation layer in the at least two operation layers.

17 Claims, 9 Drawing Sheets

(56) References Cited

U.S. PATENT DOCUMENTS

| | | | |
|---|---|---|---|
| 2019/0050717 A1 | 2/2019 | Temam et al. | |
| 2019/0205767 A1* | 7/2019 | Zhang | G06N 3/08 |
| 2019/0228762 A1 | 7/2019 | Wang et al. | |
| 2019/0340504 A1* | 11/2019 | Lee | G06N 3/08 |

FOREIGN PATENT DOCUMENTS

| | | | | |
|---|---|---|---|---|
| CN | 108470213 A | | 8/2018 | |
| CN | 109165720 A | * | 1/2019 | G06N 3/08 |
| CN | 109389212 A | | 2/2019 | |
| CN | 109389214 A | | 2/2019 | |
| WO | 2017219991 A1 | | 12/2017 | |

OTHER PUBLICATIONS

Shi Chen et al, "Shallowing Deep Networks: Layer-Wise Pruning Based on Feature Representations," IEEE Transactions on Pattern Analysis and Machine Intelligence, vol. 41, No. 12, Dec. 2019, 9 pages, XP011754464.

* cited by examiner

NEURAL NETWORK MODEL PROCESSING METHOD AND APPARATUS

CROSS-REFERENCE TO RELATED APPLICATIONS

This application is a National Stage of International Patent Application No. PCT/CN2019/076374 filed Feb. 27, 2019, which is hereby incorporated by reference in its entirety.

TECHNICAL FIELD

This application relates to the field of neural network technologies, and in particular, to a neural network model processing method and apparatus.

BACKGROUND

With development of artificial intelligence (artificial intelligence, AI) and neural network (neural network, NN) technologies, neural network models are widely applied to AI applications in fields such as image processing, speech recognition, and natural language processing, so that AI applications using neural network models increase year by year.

However, there are usually millions, tens of millions, or hundreds of millions of parameters of the neural network model. Therefore, a requirement on storage and computing capabilities of a terminal device that runs an AI application using the neural network model is relatively high, and use of the neural network model on the terminal device is limited.

At present, a method of reducing the parameters of the neural network model is usually used, to compress the neural network model. The neural network model may be compressed to some extent in this way. However, after the neural network model is compressed by using this method, precision and effectiveness of the neural network model are reduced.

SUMMARY

This application provides a neural network model processing method and apparatus, to compress a neural network model without reducing precision and effectiveness of the neural network model.

According to a first aspect, this application provides a neural network model processing method. The method may be applied to a server or a terminal device, and the method includes: obtaining a first low-bit neural network model through training, where the first low-bit neural network model includes at least two operation layers, the at least two operation layers include a first operation layer and a second operation layer, each of the at least two operation layers includes at least one operation, values/a value of a parameter and/or data used for the at least one operation are/is represented by using N bits, and N is a positive integer less than 8; compressing the first low-bit neural network model to obtain a second low-bit neural network model, where the second low-bit neural network model includes at least one operation layer, the at least one operation layer includes a third operation layer, the third operation layer is equivalent to the first operation layer and the second operation layer, and an operation layer other than the third operation layer in the at least one operation layer is the same as an operation layer other than the first operation layer and the second operation layer in the at least two operation layers.

According to the foregoing method, the first low-bit neural network model obtained through training may be compressed, and the third operation layer included in the compressed second low-bit neural network model is equivalent to the first operation layer and the second operation layer of the first low-bit neural network model before compression. In this way, the neural network model is compressed by reducing an operation layer of the neural network model. Because the operation layer included in the neural network model after compression is equivalent to the operation layer included in the neural network model before compression, it can be ensured that the neural network model is compressed without reducing precision and effectiveness of the neural network model.

In a possible design, the compressing the first low-bit neural network model to obtain a second low-bit neural network model includes: searching the at least two operation layers for the first operation layer and the second operation layer; combining the first operation layer and the second operation layer to obtain the third operation layer, where an input of the first operation layer is the same as an input of the third operation layer, an output of the first operation layer is an input of the second operation layer, and an output of the second operation layer is the same as an output of the third operation layer; and constructing the second low-bit neural network model based on the third operation layer and the operation layer other than the first operation layer and the second operation layer in the at least two operation layers.

In a possible design, the first operation layer includes at least one first operation, and the second operation layer includes at least one second operation. Based on this design, the combining the first operation layer and the second operation layer to obtain the third operation layer includes: combining the at least one first operation and the at least one second operation according to a preset rule, to obtain at least one third operation; and constructing the third operation layer based on the at least one third operation, where the third operation layer includes the at least one third operation.

In a possible design, the first operation layer includes at least one first operation, and the second operation layer includes at least one second operation. Based on this design, the combining the first operation layer and the second operation layer to obtain the third operation layer includes: constructing the third operation layer based on the at least one first operation and the at least one second operation, where the third operation layer includes the at least one first operation and the at least one second operation.

In a possible design, the second low-bit neural network model is stored or sent.

According to a second aspect, this application provides a neural network model processing method. The method may be applied to a terminal device, and the method includes: The terminal device obtains a second low-bit neural network model; and the terminal device updates the first low-bit neural network model to the second low-bit neural network model.

The first low-bit neural network model includes at least two operation layers. The at least two operation layers include a first operation layer and a second operation layer. Each of the at least two operation layers includes at least one operation. Values/a value of a parameter and/or data used for the at least one operation are/is represented by using N bits, and N is a positive integer less than 8. The second low-bit neural network model includes at least one operation layer. The at least one operation layer includes a third operation layer. The third operation layer is equivalent to the first operation layer and the second operation layer. An operation layer other than the third operation layer in the at least one operation layer is the same as an operation layer other than the first operation layer and the second operation layer in the at least two operation layers.

In a possible design, the second low-bit neural network model is a neural network model constructed based on the third operation layer and the operation layer other than the first operation and the second operation layer in the at least two operation layers. The third operation layer is an operation layer obtained by combining the first operation layer and the second operation layer. An input of the first operation layer is the same as an input of the third operation layer, an output of the first operation layer is an input of the second operation layer, and an output of the second operation layer is the same as an output of the third operation layer.

In a possible design, the first operation layer includes at least one first operation, the second operation layer includes at least one second operation, and the third operation layer includes at least one third operation. The at least one third operation is an operation obtained by combining the at least one first operation and the at least one second operation according to a preset rule.

In a possible design, the first operation layer includes at least one first operation, the second operation layer includes at least one second operation, and the third operation layer includes the at least one first operation and the at least one second operation.

In a possible design, that the terminal device obtains a second low-bit neural network model includes:

The terminal device receives the second low-bit neural network model from a server; or the terminal device locally obtains the second low-bit neural network model.

According to a third aspect, this application provides a neural network model processing method. The method may be applied to a neural network model processing system, and the method includes: A server obtains a first low-bit neural network model through training, where the first low-bit neural network model includes at least two operation layers, the at least two operation layers include a first operation layer and a second operation layer, each of the at least two operation layers includes at least one operation, values; a value of a parameter and/or data used for the at least one operation are/is represented by using N bits, and N is a positive integer less than 8. The server compresses the first low-bit neural network model to obtain a second low-bit neural network model, where the second low-bit neural network model includes at least one operation layer, the at least one operation layer includes a third operation layer, the third operation layer is equivalent to the first operation layer and the second operation layer, and an operation layer other than the third operation layer in the at least one operation layer is the same as an operation layer other than the first operation layer and the second operation layer in the at least two operation layers. The server sends the second low-bit neural network model to a terminal device. The terminal device updates the locally stored first low-bit neural network model by using the second low-bit neural network model.

According to a fourth aspect, this application provides a neural network model processing apparatus, and the apparatus includes a processing unit. The processing unit is configured to obtain a first low-bit neural network model through training, where the first low-bit neural network model includes at least two operation layers, the at least two operation layers include a first operation layer and a second operation layer, each of the at least two operation layers includes at least one operation, values/a value of a parameter and/or data used for the at least one operation are/is represented by using N bits, and N is a positive integer less than 8. The processing unit is further configured to compress the first low-bit neural network model to obtain a second low-bit neural network model, where the second low-bit neural network model includes at least one operation layer, the at least one operation layer includes a third operation layer, the third operation layer is equivalent to the first operation layer and the second operation layer, and an operation layer other than the third operation layer in the at least one operation layer is the same as an operation layer other than the first operation layer and the second operation layer in the at least two operation layers.

In a possible design, the processing unit is specifically configured to:

search the at least two operation layers for the first operation layer and the second operation layer; combine the first operation layer and the second operation layer to obtain the third operation layer, where an input of the first operation layer is the same as an input of the third operation layer, an output of the first operation layer is an input of the second operation layer, and an output of the second operation layer is the same as an output of the third operation layer; and construct the second low-bit neural network model based on the third operation layer and the operation layer other than the first operation layer and the second operation layer in the at least two operation layers.

In a possible design, the first operation layer includes at least one first operation, and the second operation layer includes at least one second operation. Based on this design, the processing unit is specifically configured to:

combine the at least one first operation and the at least one second operation according to a preset rule, to obtain at least one third operation; and construct the third operation layer based on the at least one third operation, where the third operation layer includes the at least one third operation.

In a possible design, the first operation layer includes at least one first operation, and the second operation layer includes at least one second operation. Based on this design, the processing unit is specifically configured to:

construct the third operation layer based on the at least one first operation and the at least one second operation, where the third operation layer includes the at least one first operation and the at least one second operation.

In a possible design, the apparatus further includes a storage unit.

The storage unit is configured to store the second low-bit neural network model.

Alternatively, the apparatus further includes a transceiver unit.

The transceiver unit is configured to send the second low-bit neural network model.

According to a fifth aspect, this application provides a neural network model processing apparatus, and the apparatus includes an obtaining unit and a processing unit. The obtaining unit is configured to obtain a second low-bit neural network model. The processing unit is configured to update a first low-bit neural network model to the second low-bit neural network model.

The first low-bit neural network model includes at least two operation layers. The at least two operation layers include a first operation layer and a second operation layer. Each of the at least two operation layers includes at least one operation. Values/a value of a parameter and/or data used for the at least one operation are/is represented by using N bits, and N is a positive integer less than 8. The second low-bit neural network model includes at least one operation layer.

The at least one operation layer includes a third operation layer. The third operation layer is equivalent to the first operation layer and the second operation layer. An operation layer other than the third operation layer in the at least one operation layer is the same as an operation layer other than the first operation layer and the second operation layer in the at least two operation layers.

In a possible design, the second low-bit neural network model is a neural network model constructed based on the third operation layer and the operation layer other than the first operation layer and the second operation layer in the at least two operation layers. The third operation layer is an operation layer obtained by combining the first operation layer and the second operation layer. An input of the first operation layer is the same as an input of the third operation layer, an output of the first operation layer is an input of the second operation layer, and an output of the second operation layer is the same as an output of the third operation layer.

In a possible design, the first operation layer includes at least one first operation, the second operation layer includes at least one second operation, and the third operation layer includes at least one third operation. The at least one third operation is an operation obtained by combining the at least one first operation and the at least one second operation according to a preset rule.

In a possible design, the first operation layer includes at least one first operation, the second operation layer includes at least one second operation, and the third operation layer includes the at least one first operation and the at least one second operation.

In a possible design, the apparatus further includes a transceiver unit.

The transceiver unit is configured to receive the second low-bit neural network model from a server.

Alternatively, the processing unit is further configured to: locally obtain the second low-bit neural network model.

According to a sixth aspect, this application provides a neural network model processing system, including a server and a terminal device.

The server obtains a first low-bit neural network model through training, where the first low-bit neural network model includes at least two operation layers, the at least two operation layers include a first operation layer and a second operation layer, each of the at least two operation layers includes at least one operation, values/a value of a parameter and/or data used for the at least one operation are/is represented by using N bits, and N is a positive integer less than 8. The server compresses the first low-bit neural network model to obtain a second low-bit neural network model, where the second low-bit neural network model includes at least one operation layer, the at least one operation layer includes a third operation layer, the third operation layer is equivalent to the first operation layer and the second operation layer, and an operation layer other than the third operation layer in the at least one operation layer is the same as an operation layer other than the first operation layer and the second operation layer in the at least two operation layers. The server sends the second low-bit neural network model to the terminal device. The terminal device updates the locally stored first low-bit neural network model by using the second low-bit neural network model.

According to a seventh aspect, an embodiment of this application further provides a neural network model processing apparatus. The neural network model processing apparatus has a function of implementing the method according to the first aspect. The function may be implemented by hardware, or may be implemented by hardware executing corresponding software. The hardware or software includes one or more modules corresponding to the function.

In a possible design, a structure of the neural network model processing apparatus may include a processor and a memory. The processor is configured to perform the method mentioned in the first aspect. The memory is coupled to the processor, and the memory stores program instructions and data that are necessary for the neural network model processing apparatus.

According to an eighth aspect, an embodiment of this application further provides a neural network model processing apparatus. The neural network model processing apparatus has a function of implementing the method according to the second aspect. The function may be implemented by hardware, or may be implemented by hardware executing corresponding software. The hardware or software includes one or more modules corresponding to the function.

In a possible design, a structure of the neural network model processing apparatus may include a processor and a memory. The processor is configured to perform the method mentioned in the second aspect. The memory is coupled to the processor, and the memory stores program instructions and data that are necessary for the neural network model processing apparatus.

According to a ninth aspect, this application provides a neural network model processing system, including the neural network model processing apparatus according to the seventh aspect and the neural network model processing apparatus according to the eighth aspect.

According to a tenth aspect, an embodiment of this application further provides a computer storage medium. The computer storage medium stores computer-executable instructions, and when the computer-executable instructions are invoked by a computer, the computer is enabled to perform the method according to any one of the first aspect or the designs of the first aspect or the method according to any one of the second aspect or the designs of the second aspect.

According to an eleventh aspect, an embodiment of this application further provides a computer program product. The computer program product stores instructions, and when the instructions are run on a computer, the computer is enabled to perform the method according to any one of the first aspect or the possible designs of the first aspect or the method according to any one of the second aspect or the designs of the second aspect.

According to a twelfth aspect, an embodiment of this application further provides a chip. The chip is coupled to a memory, and is configured to read and execute program instructions stored in the memory, to implement any method mentioned in the first aspect, the second aspect, or the third aspect.

DESCRIPTION OF EMBODIMENTS

The following further describes this application in detail with reference to the accompanying drawings in this specification.

The embodiments of this application provide a neural network model processing method and apparatus. The neural network model processing method and apparatus provided in the embodiments of this application may be applied but are not limited to speech recognition (automatic speech recognition, ASR), natural language process (natural language process, NLP), optical character recognition (optical character recognition, OCR), image processing, or another field. In these fields, AI applications using neural network models increase year by year. In actual application, these AI applications need to be deployed on various terminal devices. However, there are usually millions, tens of millions, or hundreds of millions of parameters of the neural network model. Therefore, a requirement on storage and computing capabilities of a terminal device that runs the AI application using the neural network model is relatively high, and use of the neural network model on the terminal device is limited. To reduce storage space occupied by these AI applications on the terminal device and a time for running these AI applications, in the prior art, the neural network model is compressed by reducing the parameters of the neural network model. However, reducing the model parameters inevitably affects precision of the model. Therefore, after the neural network model is compressed by using this method, the precision and effectiveness of the neural network model are reduced. However, according to the neural network model processing method provided in the embodiments of this application, the neural network model can be compressed without reducing precision and effectiveness of the neural network model. The method and the apparatus are based on a same inventive concept. Because a problem-resolving principle of the method is similar to that of the apparatus, mutual reference may be made to implementations of the apparatus and the method, and no repeated description is provided.

Concepts in the embodiments of this application are explained and described below, to facilitate understanding for a person skilled in the art.

Figure 1A:
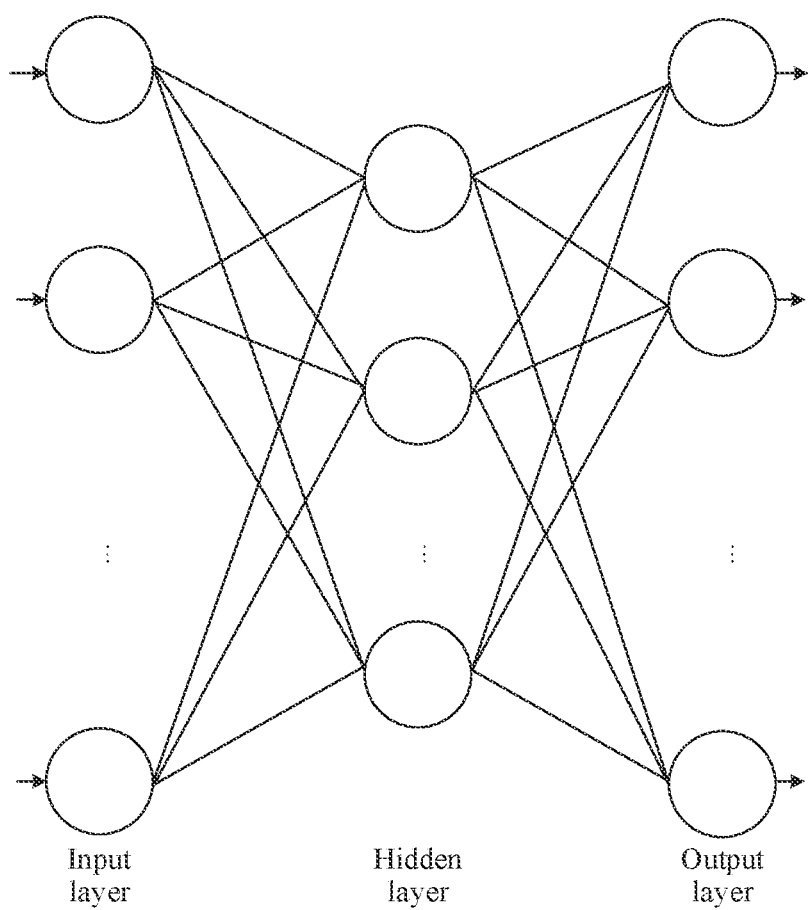
FIG. 1a is a schematic diagram of a neural network model according to an embodiment of this application.
Figure 1B:
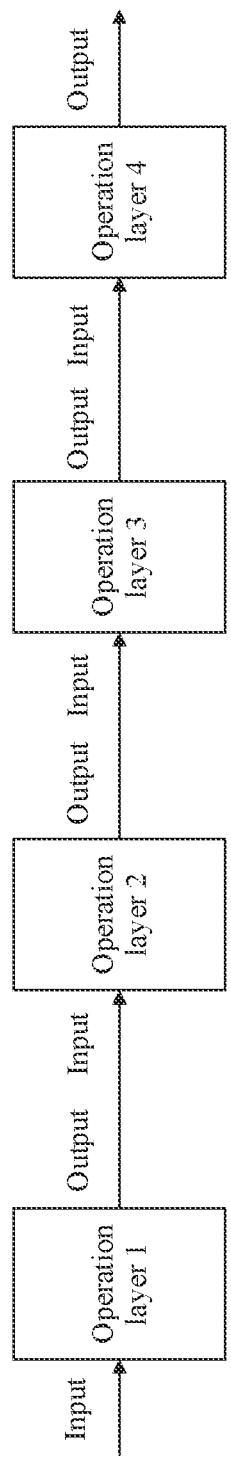
FIG. 1b is a schematic diagram of another neural network model according to an embodiment of this application.

(1) A neural network imitates a behavior feature of an animal neural network, and processes data in a structure similar to a structure connected by cerebral neural synapses. As a mathematical operation model, a neural network model includes a large quantity of nodes (which are also referred to as neurons) that are connected to each other. The neural network model may include an input layer, a hidden layer, and an output layer, as shown in FIG. 1a. The input layer inputs data for the neural network model. The output layer outputs data for the neural network model. The hidden layer is formed by connecting many nodes between the input layer and the output layer, and is used to perform operation processing on the input data. The hidden layer may include one or more layers. In the neural network model, a quantity of hidden layers and a quantity of nodes are directly related to complexity of a problem actually solved by the neural network, a quantity of nodes at the input layer, and a quantity of nodes at the output layer. It should be noted that because corresponding operations need to be performed at the input layer, the hidden layer, and the output layer, the input layer, the hidden layer, and the output layer may all be described as operation layers in the embodiments of this application. FIG. 1b is a schematic diagram of another neural network model according to an embodiment of this application. Each operation layer has an input and an output. For two adjacent operation layers (for example, an operation layer 1 and an operation layer 2 in FIG. 1b), an output of a previous operation layer is an input of a next operation layer. Each operation layer may include at least one operation. The operation is used to process an input parameter of the operation layer. After a parameter is input to the operation layer, the operation layer may first store the parameter, and when a corresponding operation needs to be performed, read the parameter and perform the corresponding operation.

(2) An AI application is an application or an application program in the AI field. The AI application in the embodiments of this application is mainly an AI application program using a neural network model.

Generally, a neural network model, with stable performance, that is obtained after a large amount of training is performed on a neural network is widely applied to AI applications. These AI applications are deployed on various terminal devices, to implement application of the neural network model in various fields. Because a process of training the neural network is a complex process, a neural network model training platform may be usually separated from a neural network model deployment platform. The neural network model processing method provided in the embodiments of this application may be implemented on the neural network model training platform, or may be implemented on the neural network model deployment platform. This is not limited in this application. For example, the neural network model training platform may include but is not limited to a computer apparatus, a server (server), a cloud service platform, or the like.

The computer apparatus may include, for example, a personal computer (personal computer, PC), a desktop computer, a tablet computer, or a vehicle-mounted computer. For example, the neural network model deployment platform may include but is not limited to a terminal device, a computer apparatus, a server, or the like. The terminal device may be a device that provides a user with voice and/or data connectivity, for example, may be a handheld device with a wireless connection function, or a processing device connected to a wireless modem. The terminal device may include user equipment (user equipment, UE), a wireless terminal device, a mobile terminal device, a subscriber unit (subscriber unit), an access point (access point, AP), a remote terminal device (remote terminal), an access terminal device (access terminal), a user terminal device (user terminal), a user agent (user agent), a user device (user device), or the like. For example, the terminal device may include a mobile phone (which is also referred to as a "cellular" phone), a computer having a mobile terminal device, a portable, pocket-sized, handheld, computer built-in, or in-vehicle mobile apparatus, a smart wearable device, or the like. For example, the terminal device is a device such as a personal communications service (personal communication service, PCS) phone, a cordless telephone, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device includes an information sensing device, for example, a barcode, radio frequency identification (radio frequency identification, RFID), a sensor, a global positioning system (global positioning system, GPS), or a laser scanner.

In the embodiments of this application, an example in which the neural network model processing method provided in this application is implemented by a computer apparatus is used for description below.

Figure 2:
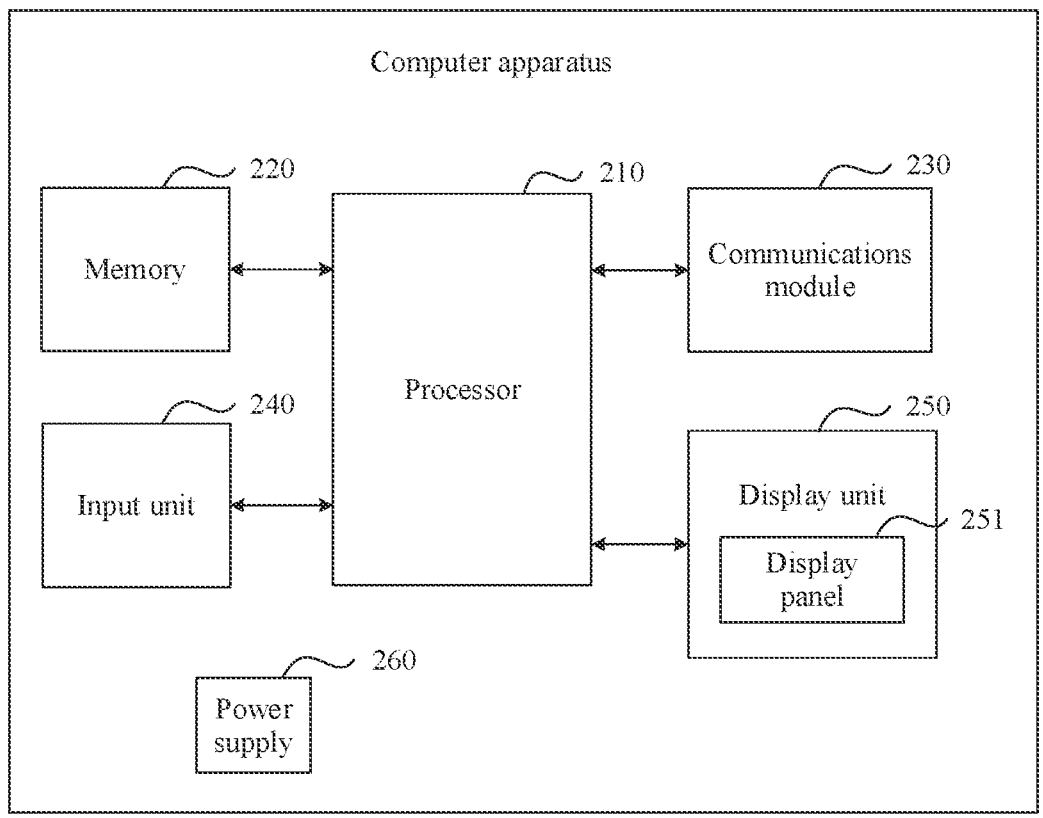
FIG. 2 is a schematic structural diagram of a computer apparatus to which an embodiment of this application may be applied.

FIG. 2 is a possible schematic structural diagram of a computer apparatus to which an embodiment of this application may be applied. As shown in FIG. 2, the computer apparatus includes components such as a processor 210, a memory 220, a communications module 230, an input unit 240, a display unit 250, and a power supply 260. A person skilled in the art may understand that a structure of the computer apparatus shown in FIG. 2 does not constitute a limitation on the computer apparatus. The computer apparatus provided in this embodiment of this application may include more or fewer components than the computer apparatus shown in FIG. 2, or combine some components, or have different component arrangements.

The following describes each component of the computer apparatus in detail with reference to FIG. 2.

The communications module 230 may be connected to another device in a wireless connection or physical connection manner, to implement data sending and receiving of the computer apparatus. Optionally, the communications module 230 may include any one or a combination of a radio frequency (radio frequency, RF) circuit, a wireless fidelity (wireless fidelity, Wi-Fi) module, a communications interface, a Bluetooth module, or the like. This is not limited in this embodiment of this application.

The memory 220 may be configured to store program instructions and data. The processor 210 performs various function applications of the computer apparatus and data processing by running the program instructions stored in the memory 220. The program instructions include program instructions that can enable the processor 210 to perform the neural network model processing method provided in the following embodiments of this application.

Optionally, the memory 220 may mainly include a program storage area and a data storage area. The program storage area may store an operating system, various application programs and program instructions, and the like. The data storage area may store various types of data such as a neural network. In addition, the memory 220 may include a high-speed random access memory, or may include a non-volatile memory such as a magnetic disk storage device or a flash memory device, or another volatile solid-state storage device.

The input unit 240 may be configured to receive information such as data or operation instructions input by a user. Optionally, the input unit 240 may include an input device such as a touch panel, a function key, a physical keyboard, a mouse, a camera, or a monitor.

The display unit 250 may implement man-machine interaction, and is configured to display, through a user interface, content such as information input by the user and information provided for the user. The display unit 250 may include a display panel 251. Optionally, the display panel 251 may be configured in a form such as a liquid crystal display (liquid crystal display, LCD) or an organic light-emitting diode (organic light-emitting diode, OLED).

Further, when the input unit includes a touch panel, the touch panel may cover the display panel 251. After detecting a touch event on or near the touch panel, the touch panel transmits the touch event to the processor 210 to determine a type of the touch event, so as to perform a corresponding operation.

The processor 210 is a control center of the computer apparatus, and connects the foregoing components by using various interfaces and lines. The processor 210 may complete various functions of the computer apparatus by executing the program instructions stored in the memory 220 and invoking the data stored in the memory 220, to implement the method provided in the embodiments of this application.

Optionally, the processor 210 may include one or more processing units. In an implementation, the processor 210 may integrate an application processor and a modem processor. The application processor mainly processes an operating system, a user interface, an application program, and the like. The modem processor mainly processes wireless communication. It should be understood that the modem processor may alternatively not be integrated into the processor 210. In this embodiment of this application, the processing unit may compress a neural network model. For example, the processor 210 may be a central processing unit (central processing unit, CPU), a graphics processing unit (Graphics Processing Unit, GPU), or a combination of a CPU and a GPU. The processor 210 may alternatively be an artificial intelligence (artificial intelligence, AI) chip that supports neural network processing, such as a network processor (network processor unit, NPU) or a tensor processing unit (tensor processing unit, TPU). The processor 210 may further include a hardware chip. The hardware chip may be an application-specific integrated circuit (application-specific integrated circuit, ASIC), a programmable logic device (programmable logic device, PLD), a digital signal processor (digital signal processing, DSP), or a combination thereof. The PLD may be a complex programmable logic device (complex programmable logic device, CPLD), a field-programmable logic gate array (field-programmable gate array, FPGA), a generic array logic (generic array logic, GAL), or any combination thereof.

The computer apparatus further includes the power supply 260 (for example, a battery) configured to supply power to each component. Optionally, the power supply 260 may be logically connected to the processor 210 by using a power management system, to implement functions such as charging and discharging of the computer apparatus by using the power management system.

Although not shown, the computer apparatus may further include components such as a camera, a sensor, and an audio collector. Details are not described herein.

It should be noted that the computer apparatus is merely an example of a device to which the method provided in the embodiments of this application is applicable. It should be understood that the method provided in the embodiments of this application may also be applied to another device other than the computer apparatus, for example, a terminal device, a server, or a cloud server. This is not limited in this application.

Figure 3:
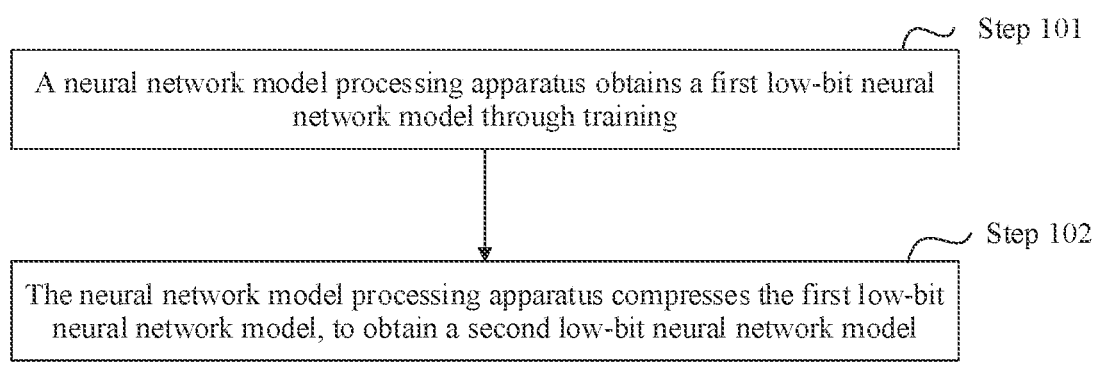
FIG. 3 is a flowchart of a neural network model processing method according to an embodiment of this application.

The neural network model processing method provided in the embodiments of this application is applicable to the computer apparatus shown in FIG. 2, and is also applicable to another device (for example, a server or a terminal device). As shown in FIG. 3, the neural network model processing method provided in this application is described by using an example in which an execution body is a neural network model processing apparatus. A specific procedure of the method may include the following steps.

Step 101: The neural network model processing apparatus obtains a first low-bit neural network model through training. The first neural network model includes at least two operation layers. The at least two operation layers include a first operation layer and a second operation layer. Each of the at least two operation layers includes at least one operation. Values/a value of a parameter and/or data used for the at least one operation are/is represented by using N bits, and N is a positive integer less than 8.

In this embodiment of this application, a low-bit neural network model is a neural network model in which values/a value of a parameter and/or data of an operation are/is represented by using bits of which a quantity is a positive integer less than 8. For example, the low-bit neural network model may include a binary neural network model or a ternary neural network model.

In this embodiment of this application, the first operation layer and the second operation layer may be predefined operation layers that can be combined. In actual application, it may be defined according to a preset rule that the first operation layer and the second operation layer can be combined. For example, the preset rule may be that the first operation layer and the second operation layer are adjacent operation layers, and operations at the first operation layer and the second operation layer are linear operations. For example, it may be predefined that an operation layer-batch normalization layer (batch normalization layer, BN), an operation layer-scale layer (scale layer, scale), and an operation layer-binary activation layer (binary activation layer, BinAct) that are directly connected may be combined. Alternatively, it may be predefined that an operation layer-binary convolution layer (binary convolution layer, BinConv), an operation layer BinAct, and an operation layer-BinConv that are directly connected may be combined. Alternatively, it may be predefined that an operation layer-binary convolution with bias layer (binary convolution with bias layer, BinConvBias) and an operation layer-BinAct that are directly connected may be combined. Alternatively, it may be predefined that an operation layer-BinConvBias, an operation layer-pooling layer (pooling layer, Pool), and an operation layer BinAct that are directly connected may be combined. Alternatively, it may be predefined that an operation layer-convolution layer (convolution layer, Conv), an operation layer BN, and an operation layer scale that are directly connected may be combined.

Step 102: The neural network model processing apparatus compresses the first low-bit neural network model to obtain a second low-bit neural network model, where the second low-bit neural network model includes at least one operation layer, the at least one operation layer includes a third operation layer, the third operation layer is equivalent to the first operation layer and the second operation layer, and an operation layer other than the third operation layer in the at least one operation layer is the same as an operation layer other than the first operation layer and the second operation layer in the at least two operation layers.

It may be understood that, in this application, the low-bit neural network model obtained through training is compressed. For example, a binary neural network model obtained through training is compressed. Compared with a method for directly compressing a floating-point neural network model, the method in this application can reduce operation layers of the neural network model. In addition, the parameter and/or data in the low-bit neural network model are/is represented by using bits of which a quantity is a positive integer less than 8, and in contrast, a parameter and/or data in the floating-point neural network model are/is represented by using bits of which a quantity is a positive integer greater than or equal to 8. Therefore, according to the method in this application, storage space occupied by a compressed model can be greatly reduced.

It should be noted that, in this application, two operation layers being the same means that operations and input parameters included in the two operation layers are completely the same.

In this embodiment of this application, the neural network model processing apparatus may compress the first low-bit neural network model by using but is not limited to the following method, to obtain the second low-bit neural network model:

Step 1021: The neural network model processing apparatus searches the at least two operation layers included in the first low-bit neural network model for the first operation layer and the second operation layer.

Step 1022: The neural network model processing apparatus combines the first operation layer and the second operation layer to obtain the third operation layer. An input of the first operation layer is the same as an input of the third operation layer, an output of the first operation layer is an input of the second operation layer, and an output of the second operation layer is the same as an output of the third operation layer. That an output of the first operation layer is an input of the second operation layer may be understood as that the first operation layer and the second operation layer are adjacent operation layers. For example, the operation layer 1 and the operation layer 2, the operation layer 2 and an operation layer 3, or the operation layer 3 and an operation layer 4 in FIG. 1b are adjacent operation layers.

It should be noted that, in this embodiment of this application, an example in which two operation layers are combined is used for description. In actual application, three operation layers, four operation layers, or the like may alternatively be combined. A quantity of combined operation layers is not limited in this embodiment of this application.

Step 1023: The neural network model processing apparatus constructs the second low-bit neural network model based on the third operation layer and the operation layer other than the first operation layer and the second operation layer in the at least two operation layers.

In this embodiment of this application, the first operation layer may include at least one first operation, and the second operation layer may include at least one second operation.

In this application, the first operation layer and the second operation layer may be combined in the following two manners to obtain the third operation layer.

First implementation: The neural network model processing apparatus combines the at least one first operation and the at least one second operation according to a preset rule, to obtain at least one third operation; and constructs the third operation layer based on the at least one third operation. In this case, the third operation layer includes the at least one third operation. It may be understood that, in the first implementation, when the first operation layer and the second operation layer are combined into the third operation layer, the at least one first operation included in the first operation layer and the at least one second operation included in the second operation layer are combined into the at least one third operation according to a predefined rule. In this embodiment of this application, the at least one third operation is equivalent to the at least one first operation and the at least one second operation. In this way, after the operations at the operation layer are combined, operations executed when the compressed neural network model is run can be reduced, and running efficiency can be improved.

It should be noted that, in this embodiment of this application, a preset rule for combining the first operation and the second operation depends on the first operation and the second operation. It may be understood that different preset rules are used for combining different operations. An example is used below for description, and details are not described herein again.

Second implementation: The neural network model processing apparatus constructs the third operation layer based on the at least one first operation and the at least one second operation. In this case, the third operation layer includes the at least one first operation and the at least one second operation. It may be understood that, in the second implementation, only the first operation layer and the second operation layer may be combined, and operations included in the first operation layer and the second operation layer are not combined. In this way, although operations during model processing are not reduced, after the first operation layer and the second operation layer are combined and the first operation layer inputs a parameter to the second operation layer, the input parameter does not need to be stored again, so that storage space can be reduced.

In an optional implementation, after compressing the first low-bit neural network model to obtain the second low-bit neural network model, the neural network model processing apparatus may further store or send the second low-bit neural network model. For example, the neural network model processing apparatus may send the second low-bit neural network model to a terminal device.

According to the neural network model processing method provided in this embodiment of this application, when a neural network model is compressed, an operation layer of the neural network model is equivalently compressed, that is, the neural network model is compressed by reducing the operation layer of the neural network model, to obtain a compressed equivalent model. In this way, it can be ensured that the neural network model is compressed without reducing precision and effectiveness of the neural network model.

Figure 4A:
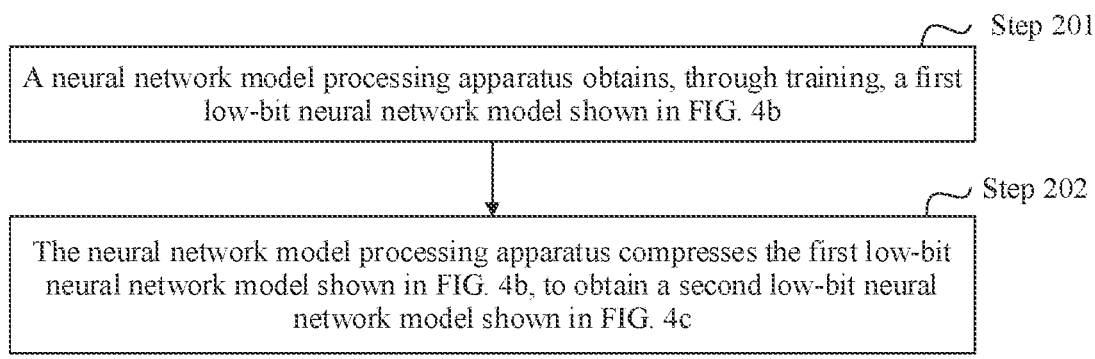
FIG. 4a is a flowchart of another neural network model processing method according to an embodiment of this application.

The following uses an example to describe the neural network model processing method provided in FIG. 3. In this example, three operation layers are combined. As shown in FIG. 4a, the method includes the following steps.

Step 201: The neural network model processing apparatus obtains, through training, a first low-bit neural network model shown in FIG. 4b, where the first low-bit neural network model includes a first operation layer, a second operation layer, a third operation layer, a fourth operation layer, and a fifth operation layer. The first operation layer, the second operation layer, and the third operation layer are predefined operation layers that can be combined. The first operation layer includes a first operation, and the first operation is: an input of the first operation layer−mu/sqrt (delta+epsilon). It is assumed that the input of the first operation layer is x, an output of x after passing through the first operation layer is y=x−mu/sqrt (delta+epsilon), where mu is a batch mean of training, delta is a batch variance of training, and epsilon is an arbitrary small fixed constant. The second operation layer includes a second operation, and the second operation is: alpha*an input of the second operation layer+beta. Because the first operation layer and the second operation layer are adjacent operation layers, and it can be learned from FIG. 4b that the second operation layer is a next layer of the first operation layer, the input of the second operation layer is equal to the output of the first operation layer. In other words, the input of the second operation layer is equal to y=x−mu/sqrt (delta+epsilon). Therefore, an output after passing through the second operation layer is z=alpha*(x−mu/sqrt (delta+epsilon))+beta, where alpha is a coefficient of the second operation layer obtained through training, and beta is a bias obtained through training. The third operation layer includes a third operation, and the third operation is: outputting 1 when an input of the third operation layer is greater than or equal to 0, or outputting negative 1 when an input of the third operation layer is less than 0. Because the second operation layer and the third operation layer are adjacent operation layers, and it can be learned from FIG. 4b that the third operation layer is a next layer of the second operation layer, the input of the third operation layer is equal to the output of the second operation layer. In other words, the input of the third operation layer is equal to z=alpha*(x−mu/sqrt (delta+epsilon))+beta.

Step 202: The neural network model processing apparatus compresses the first low-bit neural network model shown in FIG. 4b, to obtain a second low-bit neural network model shown in FIG. 4c. As shown in FIG. 4c, the second low-bit neural network model includes a $k^{th}$ operation layer, the fourth operation layer, and the fifth operation layer. The $k^{th}$ operation layer is equivalent to the first operation layer, the second operation layer, and the third operation layer shown in FIG. 4b. In addition, the $k^{th}$ operation layer includes a $k^{th}$ operation, and the $k^{th}$ operation is: outputting 1 when alpha*x is greater than or equal to thresh, or outputting negative 1 when alpha*x is less than thresh, where thresh=sqrt (delta+epsilon)*(−beta)+alpha*mu. The $k^{th}$ operation is obtained by combining the first operation, the second operation and the third operation, which may be understood as that the $k^{th}$ operation is equivalent to the first operation, the second operation, and the third operation. Herein, "equivalent" means that an output obtained after an input passes through the $k^{th}$ operation is the same as an output obtained after the same input passes through the 1st operation, the 2nd operation, and the 3rd operation.

Figure 4B:
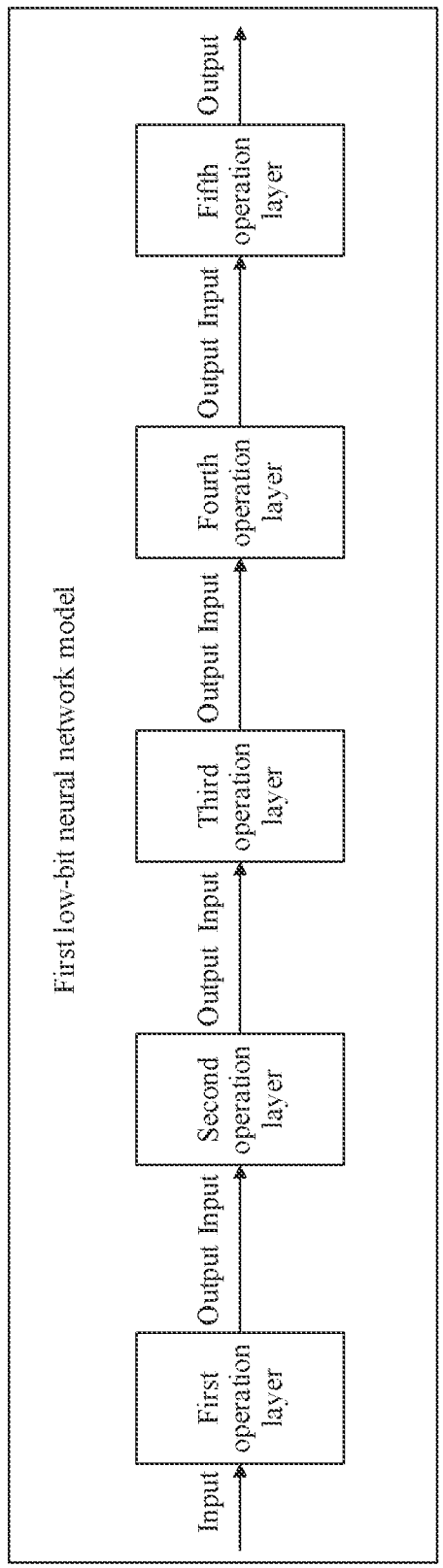
FIG. 4b is a schematic diagram of another neural network model according to an embodiment of this application.
Figure 4C:
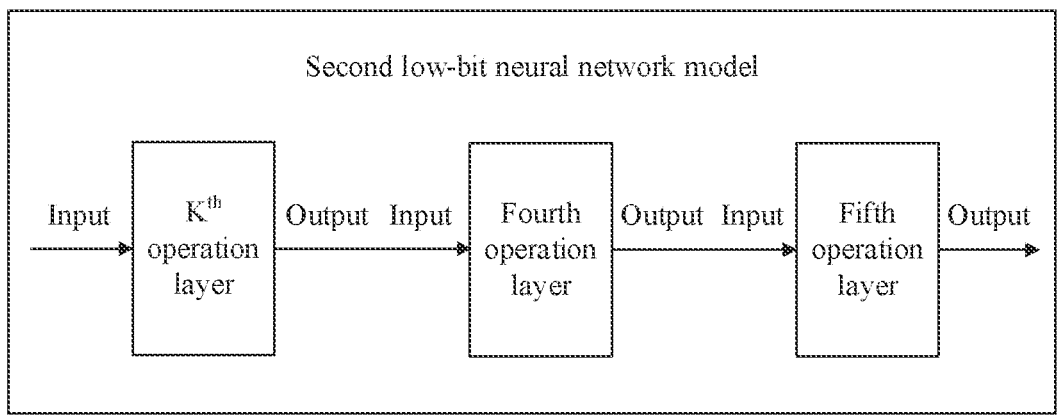
FIG. 4c is a schematic diagram of another neural network model according to an embodiment of this application.
Figure 4D:
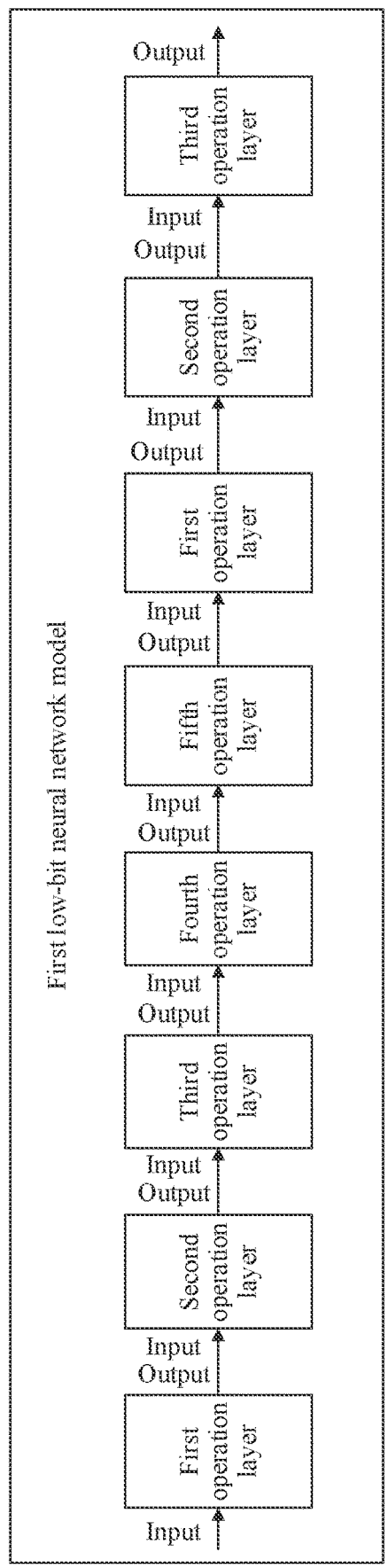
FIG. 4d is a schematic diagram of another neural network model according to an embodiment of this application.

It should be noted that FIG. 4a to FIG. 4c merely show an example in which three operation layers are combined. In actual application, a plurality of operation layers may be combined. In addition, if a duplicate combinable operation layer structure exists in a model structure, a plurality of duplicate combinable operation layer structures may be combined. For example, FIG. 4d is used as an example for description. First operation layers, second operation layers, and third operation layers in FIG. 4d are predefined operation layers that can be combined. In actual application, only a combinable operation layer structure, namely, a first operation layer, a second operation layer, and a third operation layer on the left side in FIG. 4d may be combined. Alternatively, only a combinable operation layer structure, namely, a first operation layer, a second operation layer, and a third operation layer on the right side in FIG. 4d may be combined. Certainly, the two combinable operation layer structures may alternatively be combined.

According to the foregoing method, after the operations at the operation layer are combined, operations executed when the compressed neural network model is run can be reduced. Because the operations after the model is compressed are equivalent, running efficiency can be improved without reducing precision and effectiveness of the neural network model.

In the example in FIG. 4a, the first implementation of combining the operation layers is used as an example for description. With reference to FIG. 4b, the following describes the second implementation of combining the operation layers by using an example. In the second implementation of combining the operation layers, only the first operation layer, the second operation layer, and the third operation layer may be combined, and operations included in the first operation layer, the second operation layer, and the third operation layer are not combined. In this way, the $k^{th}$ operation layer obtained by combining the first operation layer, the second operation layer, and the third operation layer still includes the first operation, the second operation, and the third operation, and the three operations are separately performed. In this combination manner, operations during model processing are not reduced, but after the first operation layer, the second operation layer, and the third operation layer are combined, the first operation layer may directly perform the second operation on the output y=x− mu/sqrt (delta+epsilon), and does not need to store the output parameter y. Similarly, the second operation layer may directly perform the third operation on the output z=alpha*(x−mu/sqrt (delta+epsilon))+beta, and does not need to store the output parameter z. In this way, memory usage during model running can be reduced.

Figure 5:
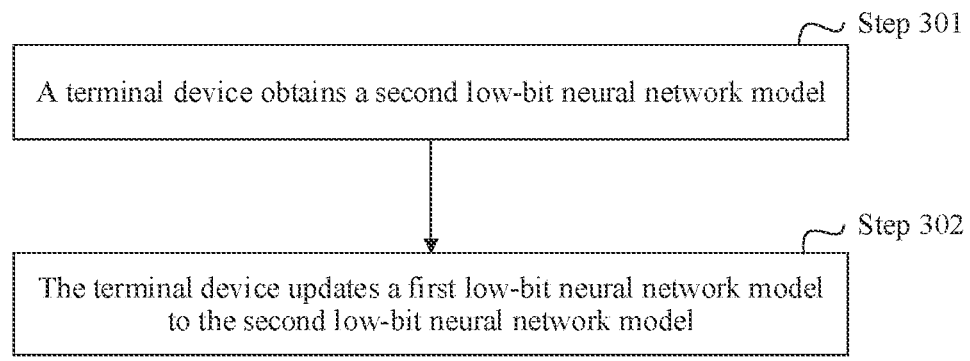
FIG. 5 is a flowchart of another neural network model processing method according to an embodiment of this application.

In this application, a final neural network model obtained according to the embodiment shown in FIG. 3 may be applied to another neural network model processing apparatus, so that the neural network model processing apparatus performs processing based on the finally obtained neural network model. Based on this, an embodiment of this application further provides another neural network model processing method. The method is implemented based on the final neural network model obtained in the embodiment shown in FIG. 3. As shown in FIG. 5, the another neural network model processing method provided in this application is described by using an example in which an execution body is a terminal device. A specific procedure of the method may include the following steps.

Step 301: A terminal device obtains a second low-bit neural network model.

In this embodiment of this application, the terminal device may obtain the second low-bit neural network model by using the following methods.

Method 1: The terminal device receives the second low-bit neural network model from a server. It may be understood that the server in Method 1 may be an example of a neural network model processing apparatus to which the method in FIG. 3 is applicable.

Method 2: The terminal device locally obtains the second low-bit neural network model. If Method 2 is used, the second low-bit neural network model may be obtained by the terminal device through compression by using the method shown in FIG. 3.

Step 302: The terminal device updates a first low-bit neural network model to the second low-bit neural network model. In this embodiment of this application, updating may be understood as replacement. In this way, the compressed second low-bit neural network model may be used in the terminal device. Compared with operation layers in the first low-bit neural network model before compression, operation layers in the compressed second low-bit neural network model are reduced. Correspondingly, operations that need to be executed and storage space for storing operation data are reduced. Therefore, operation efficiency of the terminal device can be improved without reducing precision and effectiveness of the neural network model.

It should be noted that, when the execution body of the method shown in FIG. 3 is the terminal device (for example, a mobile phone), after the second low-bit neural network model is obtained, the processing method shown in FIG. 5 may continue to be performed.

Figure 6:
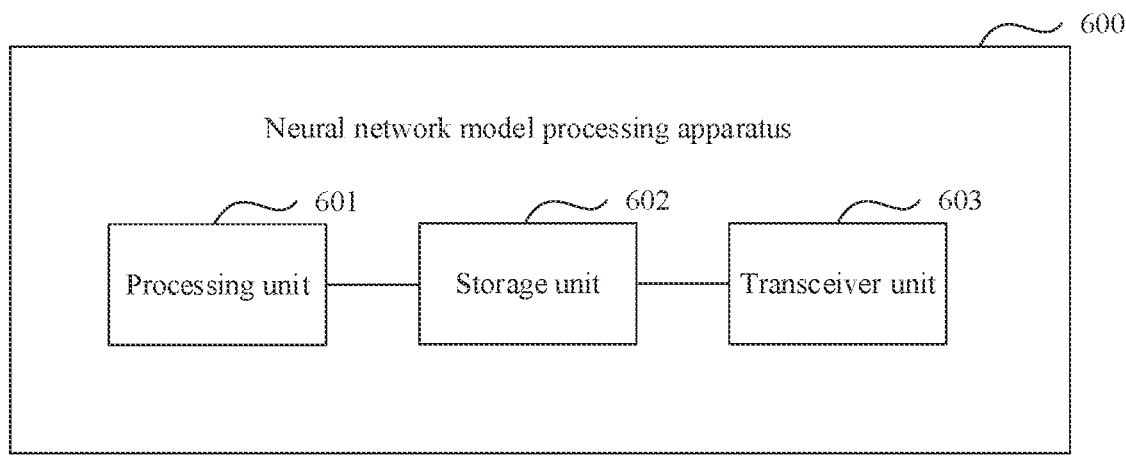
FIG. 6 is a schematic structural diagram of a neural network model processing apparatus according to an embodiment of this application.

Based on the foregoing embodiments, an embodiment of this application further provides a neural network model processing apparatus, configured to implement the neural network model processing method provided in the embodiment shown in FIG. 3. As shown in FIG. 6, the neural network model processing apparatus 600 includes a processing unit 601.

The processing unit 601 is configured to obtain a first low-bit neural network model through training. The first low-bit neural network model includes at least two operation layers. The at least two operation layers include a first operation layer and a second operation layer. Each of the at least two operation layers includes at least one operation. Values/a value of a parameter and/or data used for the at least one operation are/is represented by using N bits, and N is a positive integer less than 8.

The processing unit 601 is further configured to compress the first low-bit neural network model to obtain a second low-bit neural network model. The second low-bit neural network model includes at least one operation layer. The at least one operation layer includes a third operation layer. The third operation layer is equivalent to the first operation layer and the second operation layer. An operation layer other than the third operation layer in the at least one operation layer is the same as an operation layer other than the first operation layer and the second operation layer in the at least two operation layers.

The first operation layer and the second operation layer may be predefined operation layers that can be combined.

In an optional implementation, the processing unit 601 is specifically configured to:

search the at least two operation layers for the first operation layer and the second operation layer; combine the first operation layer and the second operation layer to obtain the third operation layer, where an input of the first operation layer is the same as an input of the third operation layer, an output of the first operation layer is an input of the second operation layer, and an output of the second operation layer is the same as an output of the third operation layer; and construct the second low-bit neural network model based on the third operation layer and the operation layer other than the first operation layer and the second operation layer in the at least two operation layers.

In an optional implementation, the first operation layer includes at least one first operation, and the second operation layer includes at least one second operation. Based on this, the processing unit 601 is specifically configured to:

combine the at least one first operation and the at least one second operation according to a preset rule, to obtain at least one third operation; and construct the third operation layer based on the at least one third operation, where the third operation layer includes the at least one third operation.

In an optional implementation, the first operation layer includes at least one first operation, and the second operation layer includes at least one second operation. Based on this, the processing unit 601 is specifically configured to:

construct the third operation layer based on the at least one first operation and the at least one second operation, where the third operation layer includes the at least one first operation and the at least one second operation.

In an optional implementation, the apparatus further includes a storage unit 602.

The storage unit 602 is configured to store the second low-bit neural network model.

Alternatively, the apparatus further includes a transceiver unit 603.

The transceiver unit 603 is configured to send the second low-bit neural network model.

Figure 7:
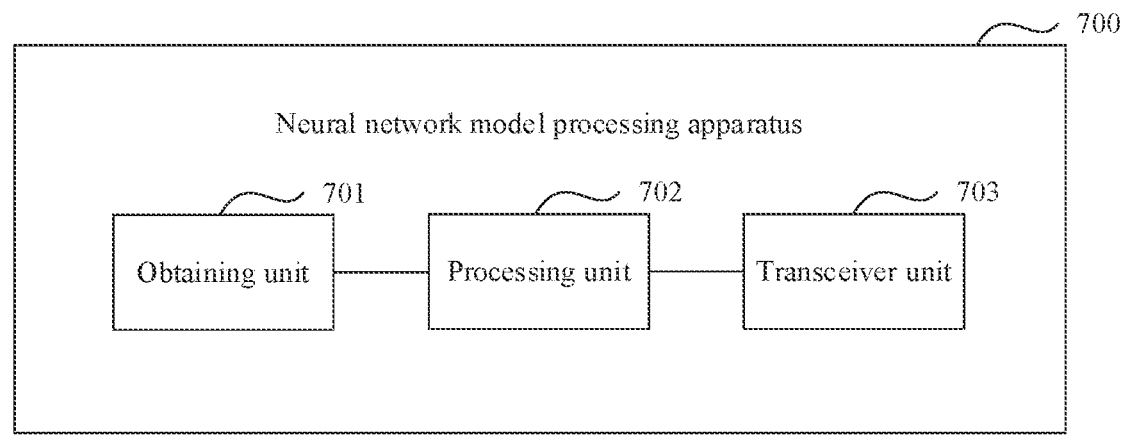
FIG. 7 is a schematic structural diagram of another neural network model processing apparatus according to an embodiment of this application.

Based on the foregoing embodiments, an embodiment of this application further provides another neural network model processing apparatus, configured to implement the processing method provided in the embodiment shown in FIG. 5. As shown in FIG. 7, the neural network model processing apparatus 700 includes an obtaining unit 701 and a processing unit 702.

The obtaining unit 701 is configured to obtain a second low-bit neural network model.

The processing unit 702 is configured to update a first low-bit neural network model to the second low-bit neural network model.

The first low-bit neural network model includes at least two operation layers. The at least two operation layers include a first operation layer and a second operation layer. Each of the at least two operation layers includes at least one operation. Values/a value of a parameter and/or data used for the at least one operation are/is represented by using N bits, and N is a positive integer less than 8. The second low-bit neural network model includes at least one operation layer. The at least one operation layer includes a third operation layer. The third operation layer is equivalent to the first operation layer and the second operation layer. An operation layer other than the third operation layer in the at least one operation layer is the same as an operation layer other than the first operation layer and the second operation layer in the at least two operation layers.

In an optional implementation, the second low-bit neural network model is a neural network model constructed based on the third operation layer and the operation layer other than the first operation layer and the second operation layer in the at least two operation layers. The third operation layer is an operation layer obtained by combining the first operation layer and the second operation layer. An input of the first operation layer is the same as an input of the third operation layer, an output of the first operation layer is an input of the second operation layer, and an output of the second operation layer is the same as an output of the third operation layer.

In an optional implementation, the first operation layer includes at least one first operation, the second operation layer includes at least one second operation, and the third operation layer includes at least one third operation. The at least one third operation is an operation obtained by combining the at least one first operation and the at least one second operation according to a preset rule.

In an optional implementation, the first operation layer includes al least one first operation, the second operation layer includes at least one second operation, and the third operation layer includes the at least one first operation and the at least one second operation.

In an optional implementation, the apparatus further includes a transceiver unit 703.

The transceiver unit 703 is configured to receive the second low-bit neural network model from a server.

Alternatively, the processing unit 702 is further configured to:

locally obtain the second low-bit neural network model.

It should be noted that, in the embodiments of this application, division into units is an example, and is merely logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

Figure 8:
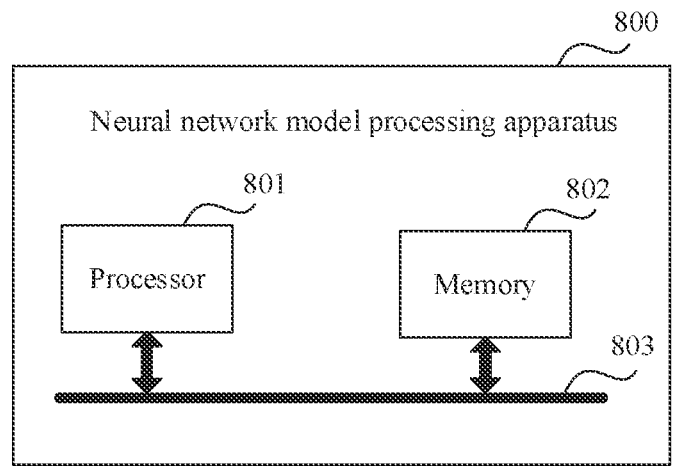
FIG. 8 is a schematic structural diagram of another neural network model processing apparatus according to an embodiment of this application.

Based on the foregoing embodiments, an embodiment of this application further provides a neural network model processing apparatus. The neural network model processing apparatus is configured to implement the neural network model processing method shown in FIG. 3. As shown in FIG. 8, the neural network model processing apparatus 800 includes a processor 801 and a memory 802.

The processor 801 may be a CPU, a GPU, or a combination of a CPU and a GPU. Alternatively, the processor 801 may be an AI chip such as an NPU or a TPU that supports neural network processing. The processor 801 may further include a hardware chip. The hardware chip may be an ASIC, a PLD, a DSP, or a combination thereof. The PLD may be a CPLD, an FPGA, a GAL, or any combination thereof. It should be noted that the processor 801 is not limited to the foregoing listed cases, and the processor 801 may be any processing device that can implement the neural network model processing method shown in FIG. 3.

The processor 801 and the memory 802 are connected to each other. Optionally, the processor 801 and the memory 802 are connected to each other through a bus 803. The bus 803 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 8, but this does not mean that there is only one bus or only one type of bus.

When being configured to implement the neural network model processing method provided in FIG. 3 in the embodiments of this application, the processor 801 performs the following operations:

obtaining a first low-bit neural network model through training, where the first low-bit neural network model includes at least two operation layers, the at least two operation layers include a first operation layer and a second operation layer, each of the at least two operation layers includes at least one operation, values/a value of a parameter and/or data used for the at least one operation are/is represented by using N bits, and N is a positive integer less than 8; and compressing the first low-bit neural network model to obtain a second low-bit neural network model, where the second low-bit neural network model includes at least one operation layer, the at least one operation layer includes a third operation layer, the third operation layer is equivalent to the first operation layer and the second operation layer, and an operation layer other than the third operation layer in the at least one operation layer is the same as an operation layer other than the first operation layer and the second operation layer in the at least two operation layers.

The first operation layer and the second operation layer may be predefined operation layers that can be combined.

In an optional implementation, the processor 801 may further perform another operation. For details, refer to specific descriptions in step 101 and step 102 in the embodiment shown in FIG. 3. Details are not described herein again.

The memory 802 is configured to store a program, data, and the like. Specifically, the program may include program code, and the program code includes computer operation instructions. The memory 802 may include a random access memory (random access memory, RAM), and may further include a non-volatile memory (non-volatile memory), for example, at least one magnetic disk memory. The processor 801 executes the program stored in the memory 802, to implement the foregoing function, thereby implementing the method shown in FIG. 3.

It should be noted that when the neural network model processing apparatus shown in FIG. 8 may be applied to a computer apparatus, the neural network model processing apparatus may be implemented as the computer apparatus shown in FIG. 2. In this case, the processor 801 may be the same as the processor 210 shown in FIG. 2, and the memory 802 may be the same as the memory 220 shown in FIG. 2.

Figure 9:
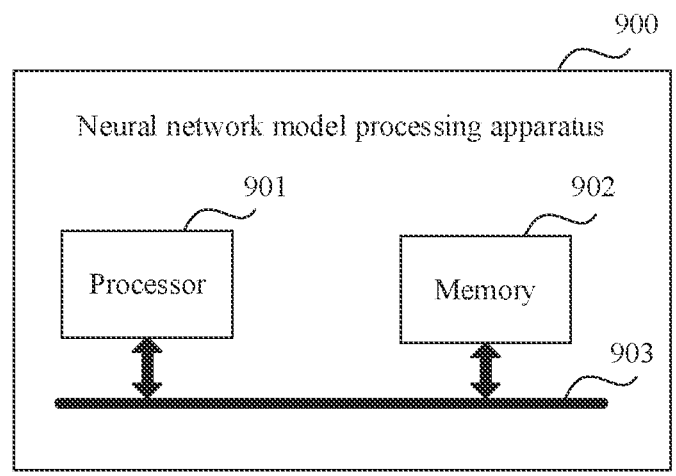
FIG. 9 is a schematic structural diagram of another neural network model processing apparatus according to an embodiment of this application.

Based on the foregoing embodiments, an embodiment of this application further provides another neural network model processing apparatus. The neural network model processing apparatus is configured to implement the method shown in FIG. 5. As shown in FIG. 9, the neural network model processing apparatus 900 includes a processor 901 and a memory 902.

The processor 901 may be a CPU, a GPU, or a combination of a CPU and a GPU. Alternatively, the processor 901 may be an AI chip such as an NPU or a TPU that supports neural network processing. The processor 901 may further include a hardware chip. The hardware chip may be an ASIC, a PLD, a DSP, or a combination thereof. The PLD may be a CPLD, an FPGA, a GAL, or any combination thereof. It should be noted that the processor 901 is not limited to the foregoing listed cases, and the processor 901 may be any processing device that can implement updating of a neural network model.

The processor 901 and the memory 902 are connected to each other. Optionally, the processor 901 and the memory 902 are connected to each other through a bus 903. The bus 903 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 9, but this does not mean that there is only one bus or only one type of bus.

When being configured to implement the method provided in the embodiments of this application, the processor 901 may perform the Mowing operations:

obtaining a second low-bit neural network model; and updating a first low-bit neural network model to the second low-bit neural network model.

The first low-bit neural network model includes at least two operation layers. The at least two operation layers include a first operation layer and a second operation layer. Each of the at least two operation layers includes at least one operation. Values/a value of a parameter and/or data used for the at least one operation are/is represented by using N bits, and N is a positive integer less than 8. The second low-bit neural network model includes at least one operation layer. The at least one operation layer includes a third operation layer. The third operation layer is equivalent to the first operation layer and the second operation layer. An operation layer other than the third operation layer in the at least one operation layer is the same as an operation layer other than the first operation layer and the second operation layer in the at least two operation layers.

In an optional implementation, the processor 901 may further perform another operation. For details, refer to specific descriptions in step 301 and step 302 in the embodiment shown in FIG. 5. Details are not described herein again.

The memory 902 is configured to store a program, data, and the like. Specifically, the program may include program code, and the program code includes computer operation instructions. The memory 902 may include a random access memory (random access memory, RAM), and may further include a non-volatile memory (non-volatile memory), for example, at least one magnetic disk memory. The processor 901 executes the program stored in the memory 902, to implement the foregoing function, thereby implementing the processing method shown in FIG. 5.

It should be noted that when the neural network model processing apparatus shown in FIG. 9 is applied to a computer apparatus, the neural network model processing apparatus may be implemented as the computer apparatus shown in FIG. 2, in this case, the processor 901 may be the same as the processor 210 shown in FIG. 2, and the memory 902 may be the same as the memory 220 shown in FIG. 2.

Based on a same concept as the foregoing method embodiments, an embodiment of this application further provides a computer-readable storage medium, storing some instructions. When these instructions are invoked and executed by a computer, the computer may be enabled to complete the method in any one of the foregoing method embodiments or the possible designs of the foregoing method embodiments. In this embodiment of this application, the computer-readable storage medium is not limited. For example, the computer-readable storage medium may be a RAM (random-access memory, random access memory) or a ROM (read-only memory, read-only memory).

Based on a same concept as the foregoing method embodiments, this application further provides a computer program product. When being invoked and executed by a computer, the computer program product can implement the method in any one of the foregoing method embodiments and the possible designs of the foregoing method embodiments.

Based on a concept the same as the foregoing method embodiments, this application further provides a chip. The chip is coupled to a transceiver, and is configured to complete the method in any one of the foregoing method embodiments and the possible implementations of the foregoing method embodiments. "Coupling" means that two components are directly or indirectly combined with each other. The combination may be fixed or movable, and the combination may allow communication of a fluid, electricity, an electrical signal, or another type of signal between the two parts.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, a person skilled in the art can make various modifications and variations to of embodiments of this application without departing from the scope of this application. This application is intended to cover these modifications and variations provided that they fall within the scope of protection defined by the following claims and their equivalent technologies.

What is claimed is:

1. A neural network model processing method, the neural network model processing method comprising:

obtaining a first low-bit neural network model through training, wherein the first low-bit neural network model comprises at least three operation layers, wherein the at least three operation layers comprise a first operation layer and a second operation layer, wherein each of the at least three operation layers comprises at least one operation, wherein one or more values of one or more of a parameter or data used for the at least one operation are represented using N bits, and wherein N is a positive integer less than eight;

compressing the first low-bit neural network model to obtain a second low-bit neural network model, wherein the second low-bit neural network model comprises at least two operation layers, wherein the at least two operation layers comprise a third operation layer, wherein the third operation layer is equivalent to a combination of the first operation layer and the second operation layer, and wherein an operation layer other than the third operation layer in the at least two operation layers is the same as an operation layer other than the first operation layer and the second operation layer in the at least three operation layers;

searching the at least three operation layers for the first operation layer and the second operation layer;

combining the first operation layer and the second operation layer to obtain the third operation layer, wherein an input of the first operation layer is the same as an input of the third operation layer, wherein an output of the first operation layer is an input of the second operation layer, and wherein an output of the second operation layer is the same as an output of the third operation layer; and constructing the second low-bit neural network model based on the third operation layer and the operation layer other than the first operation layer and the second operation layer in the at least three operation layers.

2. The neural network model processing method of claim 1, wherein the first operation layer comprises at least one first operation, wherein the second operation layer comprises at least one second operation, and wherein the neural network model processing method further comprises:

combining the at least one first operation and the at least one second operation according to a preset rule to obtain at least one third operation; and constructing the third operation layer based on the at least one third operation, wherein the third operation layer comprises the at least one third operation.

3. The neural network model processing method of claim 1, wherein the first operation layer comprises at least one first operation, wherein the second operation layer comprises at least one second operation, and wherein the neural network model processing method further comprises constructing the third operation layer based on the at least one first operation and the at least one second operation, wherein the third operation layer comprises the at least one first operation and the at least one second operation.

4. The neural network model processing method of claim 1, further comprising storing the second low-bit neural network model.

5. The neural network model processing method of claim 1, further comprising sending the second low-bit neural network model to a terminal device.

6. The neural network model processing method of claim 1, wherein the neural network model processing method is performed by a terminal device.

7. The neural network model processing method of claim 1, wherein the neural network model processing method is performed by a server.

8. A neural network model processing method performed by a terminal device, the neural network model processing method comprising:
obtaining a second low-bit neural network model; and
updating a first low-bit neural network model to the second low-bit neural network model,
wherein the first low-bit neural network model comprises at least three operation layers,
wherein the at least three operation layers comprise a first operation layer and a second operation layer,
wherein each of the at least three operation layers comprises at least one operation,
wherein one or more values of a parameter or data used for the at least one operation are represented using N bits,
wherein N is a positive integer less than eight,
wherein the second low-bit neural network model comprises at least two operation layers,
wherein the at least two operation layers comprise a third operation layer,
wherein the third operation layer is equivalent to a combination of the first operation layer and the second operation layer,
wherein an operation layer other than the third operation layer in the at least two operation layers is the same as an operation layer other than the first operation layer and the second operation layer in the at least three operation layers,
wherein the second low-bit neural network model is based on the third operation layer and the operation layer other than the first operation layer and the second operation layer in the at least three operation layers,
wherein the third operation layer is an operation layer obtained by combining the first operation layer and the second operation layer,
wherein an input of the first operation layer is the same as an input of the third operation layer, wherein an output of the first operation layer is an input of the second operation layer, and
wherein an output of the second operation layer is the same as an output of the third operation layer.

9. The neural network model processing method of claim 8, wherein the first operation layer comprises at least one first operation, wherein the second operation layer comprises at least one second operation, wherein the third operation layer comprises at least one third operation, and wherein the at least one third operation is obtained by combining the at least one first operation and the at least one second operation according to a preset rule.

10. The neural network model processing method of claim 8, wherein the first operation layer comprises at least one first operation, wherein the second operation layer comprises at least one second operation, and wherein the third operation layer comprises the at least one first operation and the at least one second operation.

11. The neural network model processing method of claim 8, further comprising receiving the second low-bit neural network model from a server.

12. The neural network model processing method of claim 8, further comprising locally obtaining the second low-bit neural network model.

13. A neural network model processing system, comprising:
a terminal device; and
a server communicatively coupled to the terminal device and configured to:
obtain a first low-bit neural network model through training, wherein the first low-bit neural network model comprises at least three operation layers, wherein the at least three operation layers comprise a first operation layer and a second operation layer, wherein each of the at least three operation layers comprises at least one operation, wherein one or more values of one or more of a parameter or data used for the at least one operation are represented using N bits, and wherein N is a positive integer less than eight;
compress the first low-bit neural network model to obtain a second low-bit neural network model, wherein the second low-bit neural network model comprises at least two operation layers, wherein the at least two operation layers comprise a third operation layer, wherein the third operation layer is equivalent to a combination of the first operation layer and the second operation layer, and wherein an operation layer other than the third operation layer in the at least two operation layers is the same as an operation layer other than the first operation layer and the second operation layer in the at least three operation layers;
search the at least three operation layers for the first operation layer and the second operation layer;
combine the first operation layer and the second operation layer to obtain the third operation layer, wherein an input of the first operation layer is the same as an input of the third operation layer, wherein an output of the first operation layer is an input of the second operation layer, and wherein an output of the second operation layer is the same as an output of the third operation layer;
construct the second low-bit neural network model based on the third operation layer and the operation layer other than the first operation layer and the second operation layer in the at least three operation layers; and
send the second low-bit neural network model to the terminal device,
wherein the terminal device is configured to update a locally stored first low-bit neural network model using the second low-bit neural network model.

14. The neural network model processing system of claim 13, wherein the first operation layer comprises at least one first operation, wherein the second operation layer comprises at least one second operation, and wherein the server is further configured to combine the at least one first operation and the at least one second operation according to a preset rule to obtain at least one third operation.

15. The neural network model processing system of claim 14, wherein the server is further configured to construct the third operation layer based on the at least one third operation, and wherein the third operation layer comprises the at least one third operation.

16. The neural network model processing system of claim 13, wherein the first operation layer comprises at least one first operation, wherein the second operation layer comprises at least one second operation, wherein the server is further configured to construct the third operation layer based on the at least one first operation and the at least one second operation, and wherein the third operation layer comprises the at least one first operation and the at least one second operation.

17. The neural network model processing system of claim 13, wherein the server is further configured to store the second low-bit neural network model.

* * * * *